United States Patent [19]
Kuppers et al.

[11] 4,381,481
[45] Apr. 26, 1983

[54] CONTROL CIRCUIT FOR A STEPPING MOTOR IN BATTERY-OPERATED INSTRUMENTS

[75] Inventors: Frieder Kuppers, Schramberg; Bernhard Scherzinger, Berkheim; Friedrich Assmus; Hans Flaig, both of Schramberg, all of Fed. Rep. of Germany

[73] Assignee: Gebruder Junghans GmbH, Schramberg, Fed. Rep. of Germany

[21] Appl. No.: 204,783

[22] Filed: Nov. 6, 1980

[30] Foreign Application Priority Data

Nov. 7, 1979 [DE] Fed. Rep. of Germany ....... 2944872

[51] Int. Cl.³ .......................................... H02K 37/00
[52] U.S. Cl. .................................... 318/696; 318/685; 368/157
[58] Field of Search ................. 318/696; 368/155, 157, 368/162, 217, 85

[56] References Cited

U.S. PATENT DOCUMENTS 4,192,131  3/1980  Hosokawa et al. ................. 368/157
4,212,156  7/1980  Kawamura et al. .................. 368/85
4,312,059  1/1982  Mandai et al. ...................... 368/157
4,326,278  4/1982  Shida et al. ........................ 368/157

*Primary Examiner*—David Smith, Jr.
*Assistant Examiner*—Saul M. Bergmann
*Attorney, Agent, or Firm*—Burns, Doane, Swecker & Mathis

[57] ABSTRACT

In a circuit for the actuation of a stepping motor for battery-operated instruments, in particular watches, the length of motor drive pulses is altered for the purpose of saving energy. In the process, different loads on the stepping motor and variable battery voltages are taken into consideration. This feature is accomplished by measuring a signal proportional to the current flowing through the field coil of the stepping motor and interrupting the drive pulse to the motor when a predetermined change occurs in the signal. The drive pulses are further limited as to both minimum and maximum length. Advantageously, the stepping motor is actuated and the signal processed by means of a digital circuit technology, in order to provide for complete integration of the circuit.

13 Claims, 6 Drawing Figures

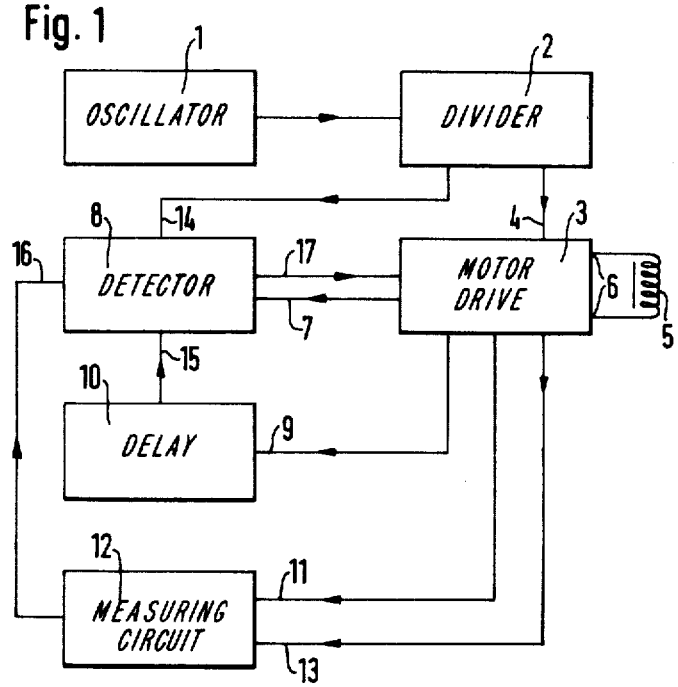
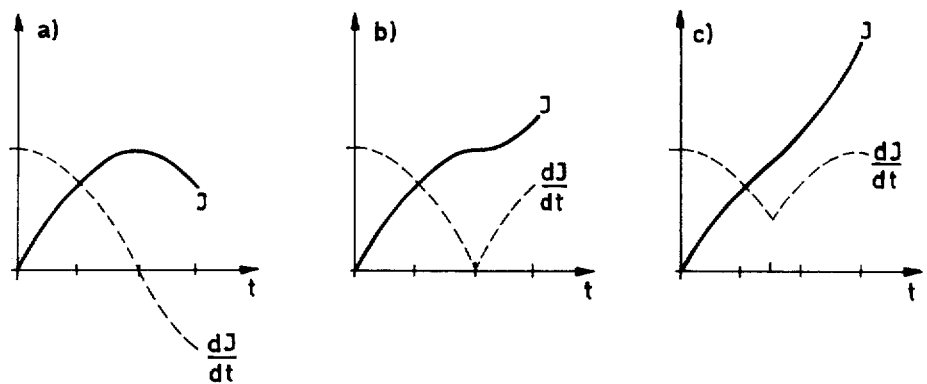

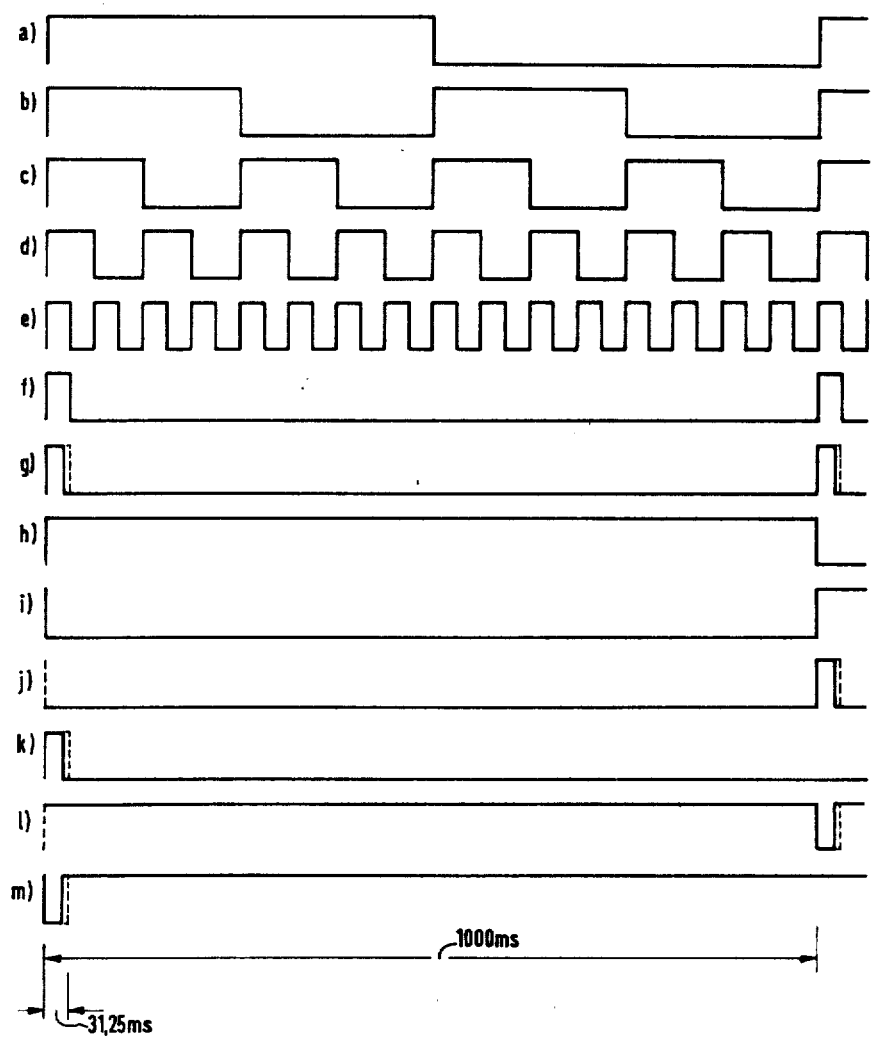

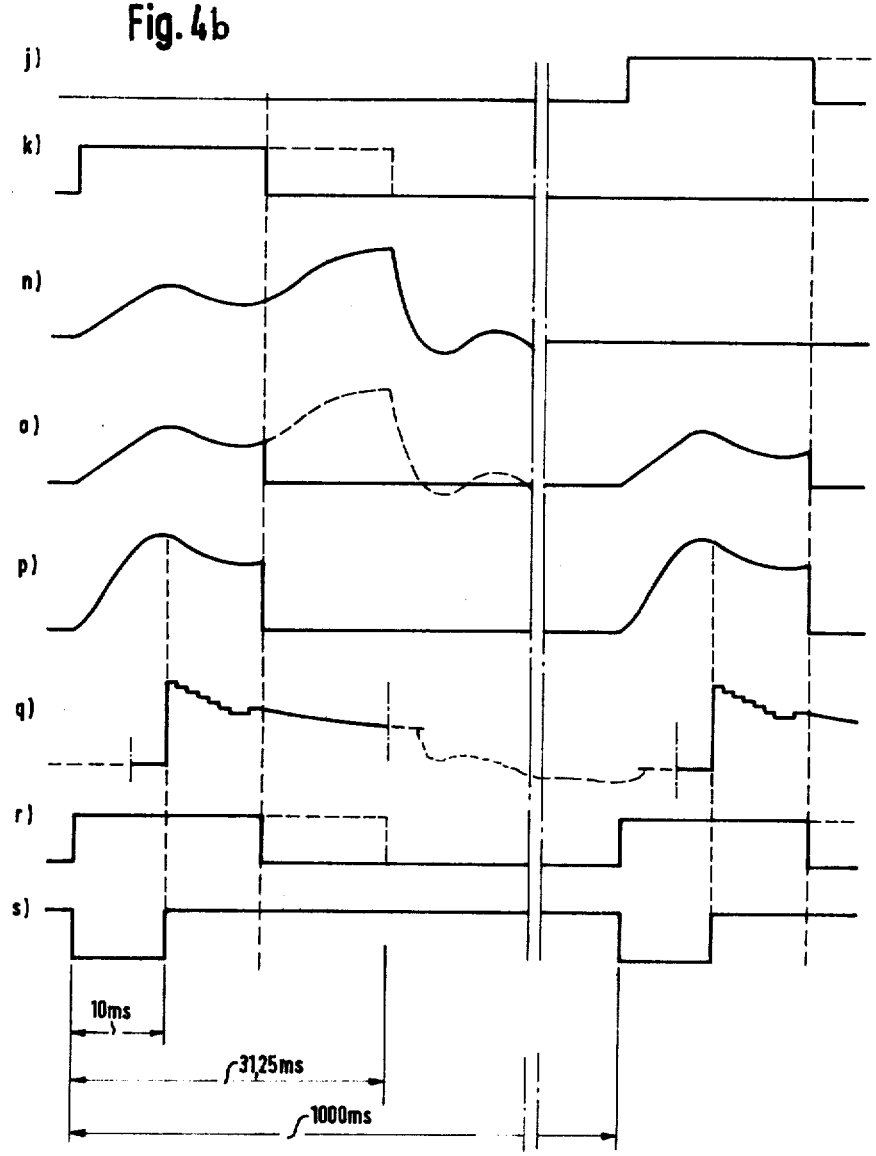

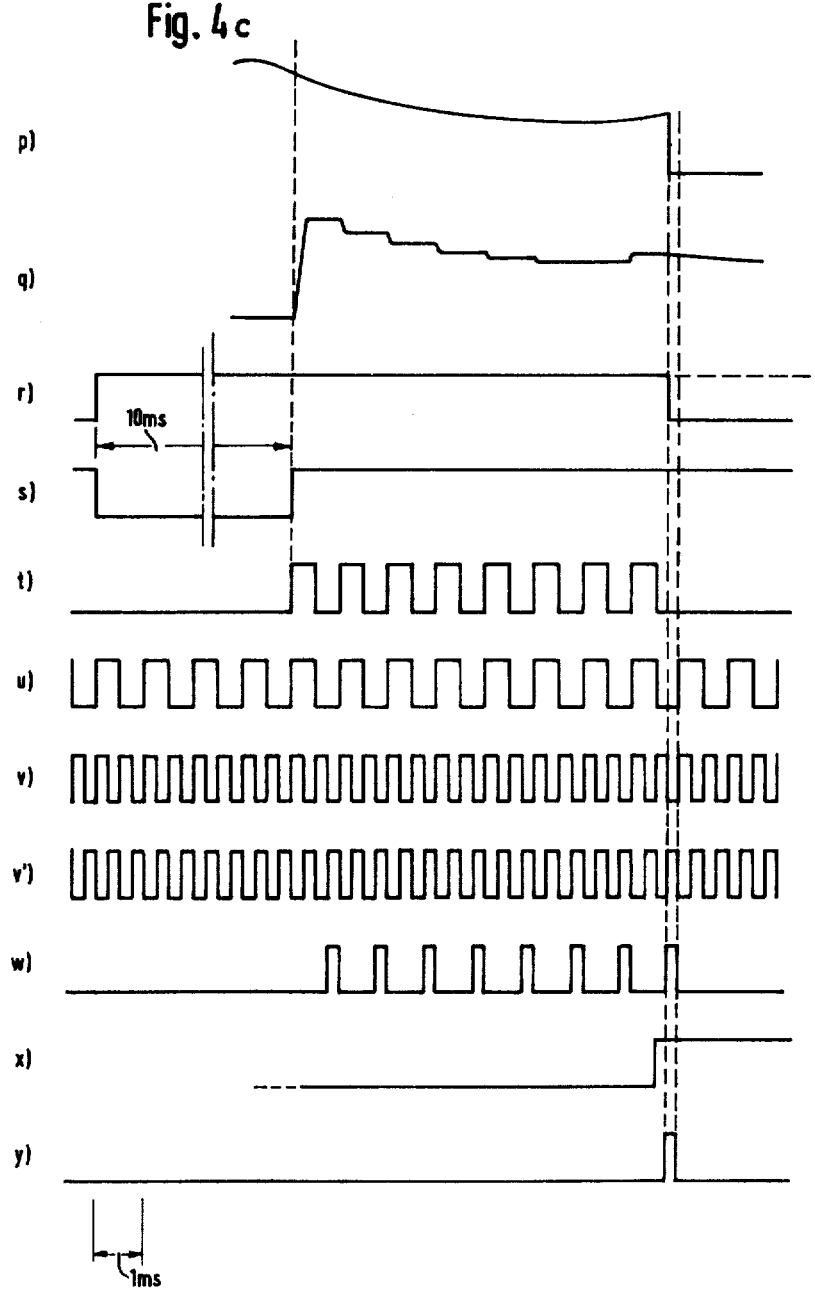

CONTROL CIRCUIT FOR A STEPPING MOTOR IN BATTERY-OPERATED INSTRUMENTS

BACKGROUND OF THE INVENTION

The present invention relates to a circuit for the control of a stepping motor in battery-operated instruments, in particular watches, wherein it is desirable to keep power consumption to a minimum to thereby prolong battery life. A circuit of this type comprises an oscillator circuit, a divider circuit, and a control, or drive, circuit to generate pulses to actuate the field coil of the stepping motor. A measuring device detects the current through the field coil of the stepping motor, and a detection circuit detects the variation over time of the current through the field coil, so that the pulses generated by the control circuit to actuate the field coil of the stepping motor may be terminated upon the occurrence of a predetermined variation of the current. A first circuit determines that the duration of the pulses for actuation of the field coil is not less than a first predetermined period of time, and a second circuit determines that the duration of the pulses for actuation of the field coil does not exceed a second predetermined period of time.

A pulse drive circuit for the actuation of a single phase rotating stepping motor is disclosed in German Offenlegungsschrift No. 2,346,975. This circuit is responsive to the current flow characteristic through the field coil of the stepping motor upon the application of a rectangular control signal. This current flow depends on (a) the type of stepping motor in use, (b) the applied voltage as a function of the state of charge of the battery, and (c) the load on the stepping motor. With a certain combination of these parameters, it is possible that the interruption of the control pulses necessary for economy in power consumption will not take place, because the minimum current required for actuation of the control circuit will not be attained. In such a case, the longest possible control signal obtainable is used, even though it may not be necessary. In order to obtain energy savings in such a case, other criteria must be employed to control the duration of the driving pulses for the stepping motor, further complicating the control circuitry.

A further disadvantage of the circuit disclosed in this publication is the fact that the circuit employs a differentiating element, consisting of a resistor and a condenser, for detecting the minimum current. The capacitance needed for this circuit is difficult to provide in integrated form, and it must therefore be incorporated as an external discrete element. Furthermore, the circuit operates in an analog mode with very low voltages in the area of current measurement and detection, so that it is susceptible to interference by external radiation.

OBJECTS AND BRIEF SUMMARY OF THE INVENTION

It is therefore an object of the present invention to provide a novel stepper motor control circuit wherein the abovementioned disadvantages are avoided by the fact that the duration of the driving pulses for the motor is limited to the necessary length for proper operation, even when no minimum occurs in the current flow.

It is a further object of the present invention to avoid analog signal processing to the extent possible by limiting such processing to a range wherein voltages are sufficiently high so that the interference susceptibility of the circuit is low.

It is a further object of the present invention to avoid the use of large capacitances so that complete integration of the circuit becomes possible.

These, as well as other objects and advantages of the present invention, are achieved in accordance with the present invention by controlling the actuation of the field coil current variation detection circuit by at least one time related control signal. The control signal can be provided by the drive circuit, the divider circuit, or both. With such an arrangement, the first circuit for controlling pulse duration functions as a delay circuit, whereby the onset of the detection of the variation over time of the current through the field coil, by means of the detection circuit, may be retarded by a predetermined period of time with respect to the onset of each control pulse. This period of time is determined so that the derivative of the variation of the current has at least attained a first minimum under all operating conditions of the stepping motor.

BRIEF DESCRIPTION OF THE DRAWINGS

FIG. 1 is a block circuit diagram of a motor drive system constructed according to the present invention;

FIGS. 3a–3c illustrate different possible variations of the flow of current at the onset of the actuating period of the stepping motor; and FIGS. 4a–4c are voltage-time diagrams at selected points in the preferred embodiment of the invention illustrated in FIG. 2.

DETAILED DESCRIPTION

Figure 2:
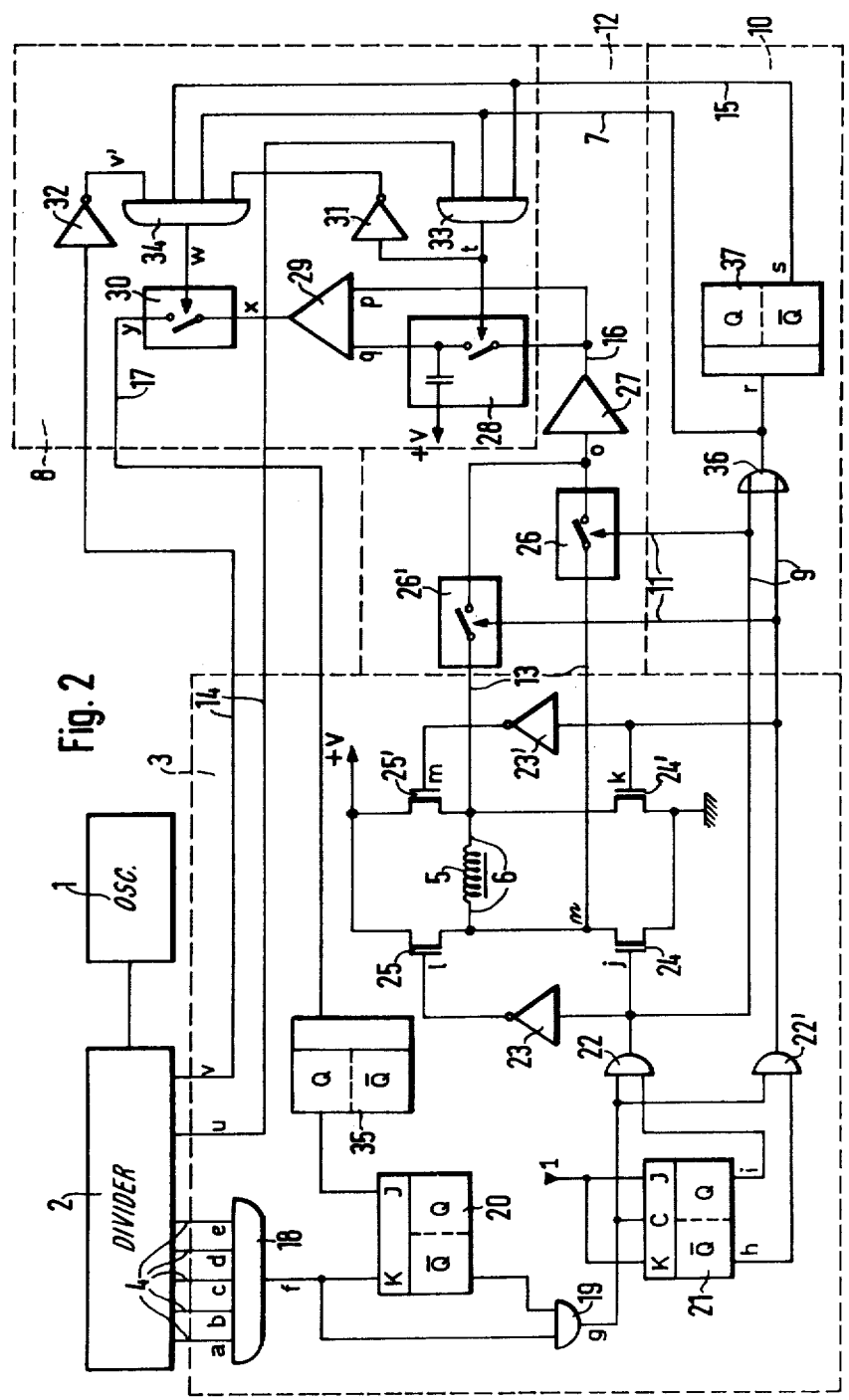
FIG. 2 is a schematic circuit diagram of a preferred embodiment of a circuit for controlling a bipolar stepping motor.

Referring to FIG. 1, a drive system for a stepping motor is illustrated in block diagram form. An oscillator circuit 1 supplies timing pulses with a frequency customary for watches, for example 32,768 or 4,194,304 Hz., to a multiple stage divider circuit 2, at the output terminals of which different timing frequencies are available. In the examplary embodiment of the invention, these frequencies can be 2048, 1024, 16, 8, 4, 2 and 1 Hz. The last five timing frequencies actuate a control, or drive, circuit 3 by means of input terminals 4. The drive circuit 3 produces corresponding driving pulses for a field coil 5 of a stepping motor at its output terminals 6. The drive circuit 3 further supplies corresponding timing pulses to one input terminal 7 of a detection circuit 8, to the input terminal 9 of a delay circuit 10, and one input terminal 11 of a measuring device 12. The drive circuit 3 further supplies a signal proportional to the current through the field coil 5 of the stepping motor to at least one other input terminal 13 of the measuring device 12.

The other two timing frequencies produced by the divider circuit 2 actuate the detection circuit 8 by way of input terminals 14. A timed control signal, produced by the delay circuit 10, is provided to a third input terminal 15 of the detection circuit 8. An additional input terminal 16 of the detection circuit 8 is supplied with a signal generated by the measuring device 12.

The detection circuit 8 delivers a signal to the control and drive circuit 3 by means of an output terminal 17, to control the duration of the driving pulses for the field coil 5. With this signal, the detection circuit 8 deactivates the stepping motor after establishing the fact that the rotor has received an adequate drive pulse to execute a rotating step and occupy its next rest position. Depending on the load of the stepping motor or the battery voltage applied, the detection circuit will terminate the drive pulse at the appropriate time to achieve maximum efficiency. The corresponding criterion to be used in determining the pulse cut-off point is furnished by the output signal of the measuring circuit. In the determination process, the minimum duration of the drive pulses, in the preferred embodiment of the invention, is 10 ms. This period of time is determined by the delay circuit 10. The maximum duration of the pulses is 31.25 ms in the preferred embodiment. It will be apparent that other suitable time periods can also be successfully used in the context of the present invention.

FIG. 2 illustrates an example of a circuit comprising the preferred embodiment of the invention for controlling a bipolar stepping motor, represented by a field coil 5. The oscillator circuit 1 and the divider circuit 2 supply to the input terminals 4 of an AND gate 18, the timing frequencies a–e of 1, 2, 4, 8 and 16 Hz, respectively. From these input signals, a timing frequency signal f of 1 Hz with a pulse duration of 31.25 ms is produced at the output terminal of the AND gate 18. This signal controls a first control logic circuit comprising an AND gate 19 and a JK flipflop 20. This first control logic circuit can shorten the pulse duration in response to control signals y that are obtained from the detection circuit 8. The shortened control pulses g produced by first control logic circuit control a second logic circuit consisting of a JK flipflop 21 operating as a counter with a clock input signal, two AND gates 22, 22' and two inverters 23, 23'. This second logic circuit supplies four series of timing pulses j, k, l, m for the actuation of a commutator circuit, consisting of four field effect transistors 24, 24', 25, and 25', in a known manner. With the aid of this commutator circuit, the field coil 5 of the bipolar stepping motor is actuated with an alternating direction current, and the field coil is always short-circuited between two drive pulses to dampen the motion of the rotor. The same series of timing pulses j, k that actuate the field effect transistors 24, 24', also serve to actuate two analog switches 26, 26'. The term "analog switch" is used hereinafter to designate an electronic switch, such as a relay, having a switching action sufficiently fast at higher frequencies to produce clean rectangular pulses. These analog switches 26, 26' connect the two terminals of the field coil 5 with the input terminal of an operational amplifier 27. During the time period of actuation of the field coil 5 of the stepping motor, a voltage signal proportional to the current flowing through the field coil is produced at the output terminal of the operational amplifier 27. This signal is provided to a sample-and-hold circuit 28, having its output terminal connected to one input terminal of comparator 29. The output terminal of the operational amplifier 27 is directly connected with a second input terminal of the comparator 29. An analog switch 30 is connected with the output terminal of the comparator 29. This analog switch 30 and the sample-and-hold circuit 28 are controlled by a third control logic consisting of two inverters 31, 32 and two AND gates 33, 34. Upon detection of a predetermined change in the field coil current, a control pulse y is provided to a monostable multivibrator 35, which produces a pulse of a duration of 1 ms for example, to actuate the JK flipflop 20 of the first control logic and thus limit the duration of the timing pulses for actuation of the stepping motor.

It is also possible within the context of the present invention to replace the analog switch 30, together with the AND gates 34 and the inverter 32 which actuate the analog switch, with other suitable structural elements. For example, an AND gate with one inverting and four non-inverting input terminals can be used. The output terminal of the comparator 29 can be connected to a non-inverting input terminal of the AND gate and the 2048 Hz output terminal of the divider 2 can be directly connected to the inverting input terminal of the AND gate. The output terminal of the AND gate will thereby supply the control pulse for actuation of the monostable multivibrator 35.

The third control logic circuit 31-34 is provided with two timing frequencies u, v of preferably 2048 and 1024 Hz from the divider circuit 2. It is also provided with the same timing pulses j, k as the field effect transistors 24, 24' by means of an OR gate 36. The inverted output signal s of a monostable multivibrator 37, producing timing pulses generated from the leading edges of the timing pulses from the OR gate 36, having in the preferred embodiment a duration of 10 ms, is also supplied to the third control logic circuit. These timing pulses have the effect of actuating the detection circuit 8 only after 10 ms following the onset of each drive pulse for the field coil 5 of the stepping motor.

FIGS. 3a, 3b and 3c illustrate different possible types of the current flow I through the field coil 5 at the onset of actuation of the motor with a rectangular pulse. They also illustrate the current flow derivative dI/dt of each type of flow. The illustrated types of current flow are created by the fact that the acceleration of the rotor of the stepping motor induces a counter voltage (EMF), which acts against the motion of the rotor.

Empirical investigations have shown that a stepping motor is able to perform a complete rotary step when the current begins to rise following a minimum or a turning point. The detection circuit 8 functions so that a rise of a signal proportional to the rise of the current through the field coil triggers a pulse, which terminates the drive pulse for the stepping motor. To prevent a response of the detection circuit 8 to the rise of the current at the onset of a drive pulse, the detection circuit 8 must be inactive until after the first current peak is completed, i.e. until the flow of the current has reached a maximum or a turning point. This point occurs when the dI/dt derivative of the current flow passes through a first minimum.

In the present invention, the detection circuit 8 is rendered inactive by the delay circuit 10 from the onset of an actuation pulse at least until the current maximum point is attained. In the preferred embodiment of the motor control circuit, the delay time of the delay circuit 10, which essentially consists of the monostable multivibrator 37, is set at 10 ms. For adaptation to different stepping motors, different loads and different battery voltages, appropriate means to alter this delay time can be provided. It is also within the scope of the invention to use a different suitable electronic element, for example a counter, as the delay circuit 10. In such a case, the counter receives a starting pulse at the onset of the actuating pulse, and subsequently counts with a higher frequency, for example 1024 Hz, to 10 (corresponding to 10 ms) and then produces a control pulse. Due to the programmability of a counter, it is possible to adapt the delay time to different stepping motors, loads and battery voltages.

The operation of the entire circuit illustrated in FIG. 2 will be explained in more detail with the aid of FIG. 4. In FIG. 4, the different signals occurring at various points in the circuit are illustrated. The time scale is indicated in the drawing for each case: in FIG. 4a, 100 ms correspond approximately to 16 mm. Signals j and k are repeated in FIG. 4b with a scale of 10 ms≃20 mm, and signals n to s have the same scale. Signals t to y are drawn in FIG. 4c so that 1 ms corresponds approximately to 10 mm, and signals p to s are repeated at that same scale in FIG. 4c.

The clocking signals a-e are produced at the corresponding output terminals of the divider circuit 2. Their combination in the AND gate 18 results in 1 Hz pulses with a duration of 31.25 ms, as shown by signal f. The 1 Hz pulses may be shortened in the first control logic circuit consisting of the AND gate 19 and the JK flip-flop 20 by means of a control pulse y from the detection circuit 8. A shortened control pulse is shown as g in FIG. 4a, wherein the broken line signifies the maximum possible pulse length. The control pulses j and k for the field effect transistors 24 and 24' are produced from this signal. For this purpose, the signal is presented as a clock signal to the JK flipflop 21 and also to the AND gates 22 and 22'. The output signals h and i of the flip-flop 21, which alternatingly are logically high and low, are applied to the other input terminals of the AND gates 22 and 22', respectively. These signals are inverted by the inverters 23 and 23', and control the field effect transistors 25, 25' of the commutator circuit. By means of this control arrangement, the pairs of field effect transistors 24, 25', and 24', 25 are alternatingly rendered conductive for the duration of a control pulse, thereby driving the stepping motor. After the termination of a control pulse, the field effect transistors 25, 25' are rendered conductive until the onset of the next control pulse, so that the field coil 5 of the stepping motor is short-circuited. This serves to dampen the motion of the stepping motor following the termination of the drive pulse.

A typical flow of current through the field coil 5 of a stepping motor during a rotary step is shown as signal n. By means of the analog switches 26, 26', which are controlled by the pulses j and k respectively, a voltage signal o proportional to the current through the field coil 5 is applied to the input terminal of the operational amplifier 27. The analog switches 26, 26' insure that the signal applied to the amplifier retains the same polarity, independently of the direction of the current through the field coil 5.

The output signal of the operational amplifier 27 is applied through the sample-and-hold circuit 28 to the first input terminal of the comparator 29 as signal q, and is directly applied to the second input terminal of the same comparator 29 as signal p. An analog switch 30 is connected to the output terminal of the comparator 29, and conducts a signal x appearing at the output terminal of the comparator 29 only during certain periods of time. The clock signal t is used to control the sample-and-hold circuit 28 and the clock signal w controls the analog switch 30. The t clock signal is generated by the interconnection of the following signal sequences in the AND gate 33: the two pulse signals j and k applied to the two field effect transistors 24 and 24' are interconnected in the OR gate 36. The resulting signal r is applied to the AND gate directly and by way of the monostable multivibrator 37. The monostable multivibrator produces at its inverting output terminal $\overline{Q}$ a signal s, which at the onset of each drive pulse changes from logic 1 to logic 0 and returns to logic 1 after 10 ms. With these two signals r and s, the sample-and-hold circuit 28, and thus the entire detection circuit 8, is in operation only during a period of time beginning 10 ms after the onset of each drive pulse and terminating with the end of the drive pulse.

The AND gate 33 is also controlled by a clock signal u having a frequency which is at least 100 times, and preferably at least 1000 times the frequency of the motor drive pulses. In the preferred embodiment, this clock signal has a frequency of 1024 Hz, which assures that the sample-and-hold circuit 28 samples during its operating period for about 0.5 ms in intervals of approximately 1 ms (as shown by signal t). The comparator 29 produces a logic 1 signal if the signal p is larger than the signal q, i.e. when the current in the field coil 5 is rising. In order to prevent the drive circuit 3 from receiving a nonrelevant control signal from the detection circuit 8 during the sample period, the analog switch 30 is controlled by the AND gate 34 with its output signal w, so that the analog switch 30 is not closed during the sample period. Furthermore, the AND gate 34 is controlled with the clock signals r and s, so that the analog switch 30 is capable of closing only 10 ms after the onset of each drive pulse for the stepping motor and opens after the termination of each drive pulse. The AND gate 34 is additionally controlled by a clock signal v', which is twice the frequency of the clock signal u and inverted with respect thereto. This clock signal is produced through the inverter 32 from the signal sequence v from the divider circuit 2. A comparison of the w clock signal produced by the AND gate 34 with the t clock signal produced by the AND gate 33 shows that during the period of time wherein the detection circuit 8 is in operation, sampling takes place for approximately 0.5 ms in 1 ms periods, followed by waiting for about 0.25 ms, while during this 0.25 ms period a potential control pulse y can be passed to the drive circuit 3 by the analog switch 30.

The monostable multivibrator serves to eliminate chatter from the input terminal of the drive circuit 3. It produces a pulse of defined length, for example 1 ms, when a signal appears at the output terminal of the detection circuit 8. This is desirable since, upon the appearance of this signal, the drive pulses for the stepping motor are interrupted whereupon the detection circuit 8 is inhibited from operating.

The present invention may be embodied in other specific forms without departing from the spirit or essential characteristics thereof. The presently disclosed embodiment is therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A circuit for the control of a stepping motor, comprising:
    an oscillator circuit;
    a divider circuit for producing timing signals from the output signals of said oscillator circuit;
    a drive circuit for the generation of pulses to actuate a field coil of a stepping motor;
    a measuring device for detecting current flowing through the field coil of the stepping motor and producing an output signal related thereto;

a detection circuit for detecting the variation over time of the flow of the current through the field coil, and for terminating said actuating pulses upon detection of a predetermined change in the current;

a delay circuit for inhibiting operation of said detection circuit for a first predetermined period of time with respect to the onset of each actuating pulse, wherein said first predetermined period of time is determined so as to insure that a derivative of the variation over time of the current under all operating conditions of the stepping motor has at least attained a minimum value, to thereby insure that the duration of said actuating pulses is not less than said first predetermined period of time; and a timing circuit for insuring that the duration of said actuating pulses does not exceed a second predetermined period of time.

2. A circuit for controlling a stepping motor according to claim 1, wherein:

said measuring device provides an output signal proportional to the current flowing through the field coil of the stepping motor in response to timing pulses that are produced by said drive circuit in response to output signals from said divider circuit;

said delay circuit is activated by said timing pulses to produce a control signal; and said detecting circuit is responsive to timing signals from said divider circuit, said timing pulses from said drive circuit, said control signal from said delay circuit, and the output signal from said measuring device to produce an output signal for controlling operation of said drive circuit.

3. A circuit for controlling a stepping motor according to claims 1 or 2, wherein said detection circuit comprises a control logic circuit for producing control timing pulses, a first switching circuit responsive to at least some of said timing pulses for providing intermediate storage of voltage values measured by said measuring device, a second switching circuit for comparing a stored voltage value and an instantaneous voltage value from said measuring device, and an analog switch responsive to at least some of said timing pulses and connected to an output terminal of said comparing means.

4. A circuit for controlling a stepping motor according to claim 3, wherein said first switching circuit comprises a sample-and-hold circuit, said second switching circuit comprises a comparator, and said control logic circuit comprises two AND gates respectively connected to said sample-and-hold circuit and said analog switch.

5. A circuit for controlling a stepping motor according to claim 4 wherein said comparator compares a reference voltage produced by said sample-and-hold circuit with an instantaneous voltage produced by said measuring device, and produces an output signal when the instantaneous voltage is greater than the reference voltage.

6. A circuit for controlling a stepping motor according to claim 3 wherein said control logic circuit produces said control timing pulses in response to first and second timing signals from said divider circuit which are respectively at least one hundred times and two hundred times the frequency of said actuating pulses, and the ratio of the frequencies of said first and second timing signals is 2:1.

7. A circuit for controlling a stepping motor according to claim 6 wherein said first and second timing signals are at least one thousand times and two thousand times the frequency of said actuating pulses.

8. A circuit for controlling a stepping motor according to claim 6 wherein said control logic circuit is further responsive to the output signal of said delay circuit and to said actuating pulses.

9. A circuit for controlling a stepping motor according to claim 4 wherein the AND gate connected to said analog switch is responsive to an output signal from the AND gate connected to said sample-and-hold circuit, said actuating pulses, said delay circuit and a timing signal from said divider circuit so that said analog switch is enabled to produce an output signal only while said sample-and-hold circuit is in a hold state after the period of time determined by said delay circuit and while an actuating pulse is applied to the motor field coil.

10. A circuit for controlling a stepping motor according to claim 4 wherein the AND gate connected to said sample-and-hold circuit is responsive to said actuating pulses, said delay circuit and a timing signal from said divider circuit so that said sample-and-hold circuit samples the output signal of the measuring device at a rate determined by said timing signal after the period of time determined by said delay circuit and while an actuating pulse is applied to the motor field coil.

11. A circuit for controlling a stepping motor according to claim 1 wherein said delay circuit comprises a monostable multivibrator.

12. A circuit for controlling a stepping motor according to claim 11 wherein said monostable multivibrator has a variable time constant to enable the delay circuit to be adapted to different stepping motors.

13. A circuit for controlling a stepping motor according to claim 1 wherein said measuring device is connected with the terminals of the field coil by means of analog switches controlled by said actuating pulses so that the output signal produced by the measuring device is always of the same polarity independently of the direction of flow of current through the field coil.

* * * * *